US008070241B2

(12) United States Patent
Mulligan (10) Patent No.: US 8,070,241 B2
(45) Date of Patent: Dec. 6, 2011

(54) TRACK CHAIN JOINT WITH ROTATABLE PIN

(75) Inventor: Patrick J. Mulligan, Dubuque, IA (US)

(73) Assignee: Deere & Company, Moline, IL (US)

( * ) Notice: Subject to any disclaimer, the term of this patent is extended or adjusted under 35 U.S.C. 154(b) by 267 days.

(21) Appl. No.: 12/548,682

(22) Filed: Aug. 27, 2009

(65) Prior Publication Data

US 2011/0049975 A1 Mar. 3, 2011

(51) Int. Cl.
*B62D 55/205* (2006.01)
*B62D 55/21* (2006.01)

(52) U.S. Cl. ........................................ 305/196; 305/195
(58) Field of Classification Search ................ 305/100, 305/102, 103, 106, 185, 195, 196, 197, 202, 305/203
See application file for complete search history.

(56) References Cited

U.S. PATENT DOCUMENTS

| | | | |
|---|---|---|---|
| 1,341,761 A * | 6/1920 | Putnam et al. | 305/196 |
| 1,512,152 A * | 10/1924 | White | 305/127 |
| 3,469,891 A | 9/1969 | Deli | |
| 3,492,054 A | 1/1970 | Boggs et al. | |
| 3,554,588 A | 1/1971 | Reinsma et al. | |
| 3,601,454 A | 8/1971 | Reinsma | |
| 3,606,497 A | 9/1971 | Gilles | |
| 3,762,778 A | 10/1973 | Boggs et al. | |
| 3,819,242 A | 6/1974 | Robinson | |
| 3,948,572 A * | 4/1976 | Korner et al. | 305/195 |
| 4,059,314 A * | 11/1977 | Amstutz | 305/154 |
| 4,068,732 A * | 1/1978 | Granryd | 180/6.7 |
| 4,149,758 A | 4/1979 | Livesay | |
| RE30,039 E | 6/1979 | Clemens et al. | |
| 4,199,199 A | 4/1980 | Granda | |
| 4,218,070 A * | 8/1980 | Koepplin | 280/28.5 |
| 4,244,588 A | 1/1981 | Langewisch | |
| 4,251,182 A | 2/1981 | Schroeder | |
| 4,438,981 A | 3/1984 | Harms | |
| 4,560,174 A | 12/1985 | Bisis | |
| 4,818,041 A | 4/1989 | Oertley | |
| 4,840,438 A | 6/1989 | Cory | |
| 5,183,318 A | 2/1993 | Taft et al. | |
| 5,230,589 A | 7/1993 | Gillespie | |
| 5,259,703 A | 11/1993 | Gillespie | |
| 5,511,869 A | 4/1996 | Edwards et al. | |
| 5,636,911 A * | 6/1997 | Korpi | 305/197 |

(Continued)

FOREIGN PATENT DOCUMENTS

EP 0860352 B1 7/2003

(Continued)

OTHER PUBLICATIONS

Background Information (prior art) (3 pages).

(Continued)

*Primary Examiner* — Kip T Kotter (57) ABSTRACT

A track chain joint for an endless track chain of a track-type vehicle is configured to engage first and second sprockets of a drive wheel of the track-type vehicle. Exemplarily, the joint has a pin, a bushing on the pin, first and second collars positioned respectively axially outboard of the bushing on the pin, and first and second drive caps positioned respectively axially outboard of the first and second collars and fixed to the pin, the first and second drive caps configured to engage respectively the first and second sprockets. Such components may be embodied in a cartridge.

19 Claims, 8 Drawing Sheets

U.S. PATENT DOCUMENTS

| | | | |
|---|---|---|---|
| 5,829,849 | A | 11/1998 | Lawson |
| 6,074,022 | A | 6/2000 | Anderton et al. |
| 6,145,941 | A | 11/2000 | Anderton et al. |
| 6,176,491 | B1 | 1/2001 | Bertoni |
| 6,206,491 | B1 | 3/2001 | Hisamatsu |
| 6,250,726 | B1 | 6/2001 | Burdick et al. |
| 6,371,577 | B1 | 4/2002 | Hasselbusch et al. |
| 6,382,742 | B1 | 5/2002 | Hasselbusch et al. |
| 6,386,651 | B1 * | 5/2002 | Gerardin et al. ............ 305/100 |
| 6,454,366 | B1 | 9/2002 | Egle |
| 6,656,293 | B2 | 12/2003 | Black et al. |
| 6,739,680 | B2 | 5/2004 | Hasselbusch et al. |
| 6,783,129 | B2 | 8/2004 | Akita et al. |
| 6,869,244 | B2 | 3/2005 | Anderton et al. |
| 7,347,513 | B2 | 3/2008 | Johannsen et al. |
| 7,766,433 | B2 | 8/2010 | Mulligan et al. |
| 2003/0219181 | A1 | 11/2003 | Yamamoto et al. |
| 2004/0114993 | A1 | 6/2004 | Anderton et al. |
| 2004/0228676 | A1 | 11/2004 | Oertley |
| 2006/0251349 | A1 | 11/2006 | Schmeling et al. |
| 2009/0102281 | A1 | 4/2009 | Diekevers et al. |

FOREIGN PATENT DOCUMENTS

| | | |
|---|---|---|
| EP | 1391371 A1 | 2/2004 |
| EP | 1880932 A1 | 1/2008 |
| EP | 1902932 A1 | 3/2008 |
| WO | 8100545 | 3/1981 |
| WO | 8908577 | 9/1989 |

OTHER PUBLICATIONS

Tank Track Chain Images (prior art) (3 pages).
Caterpillar D6K Image Showing Track Chain on Idler (prior art) (1 page).
Toy Sherman Tank Information (16 pages) (2003).
CASE Extended Life Track Information (1 page) (prior art).
Caterpillar SystemOne™ Undercarriage Information (7 pages) (prior art).
Deere J Dozers Product Brochure (24 pages) (prior art).
Drawings of Prior Art System (2 pages) (prior art).
Statement About Track Chain Joints (3 pages) (prior art).
Track Joint Seal of Deere 850J Crawler (1 page) (prior art), 1997.
Crawler Loader Oil Filled Bucket Pin Bearing (1 page) (prior art).
European Search Report dated Nov. 28, 2007 (6 pages).
European Search Report and Associated Documents in Counterpart European Application No. EP 10 17 4197 (6 pages)(Aug. 10, 2011).

* cited by examiner

TRACK CHAIN JOINT WITH ROTATABLE PIN

FIELD OF THE DISCLOSURE

The present disclosure relates to an endless track chain for a track-type vehicle, and, more particularly, to a track chain joint for relative rotation between links of the track chain.

BACKGROUND OF THE DISCLOSURE

Track-type vehicles (e.g., crawlers, excavators, tracked tree-felling machines) have an undercarriage typically with at least one track on each side of the vehicle. Each track typically includes an endless track chain, with ground-engaging shoes mounted thereon, trained about a drive sprocket, one or more idlers, and rollers. In many cases, each track chain includes a number of joints, each such joint interconnecting a first link set, having a first link and a second link, and a second link set, having a third link and a fourth link, for relative rotation between the first and second link sets as the track advances through its closed-loop path.

SUMMARY OF THE DISCLOSURE

According to the present disclosure, there is provided an endless track chain for use with a track-type vehicle. The endless track chain comprises a first link set with first and second links, a second link set with third and fourth links, and a joint for relative rotation between the first link set and the second link set. The joint is configured to engage first and second sprockets of a drive wheel of the vehicle.

The joint may be configured, for example, as a cartridge assembled before the cartridge is joined to those links and sealed to contain lubricant within the cartridge. The lubricant may be added to the cartridge before or after the cartridge is joined to the links.

The joint comprises, for example, a pin, a bushing, a first collar, a second collar, a first drive cap, and a second drive cap. The bushing is journalled on the pin for relative rotation between the bushing and the pin and is fixed to the first and second links promoting the torsional rigidity of the chain and thus to the resistance of the chain to leakage of lubricant from the joint ("torsional rigidity" refers to the chain's resistance to twisting about its longitudinal axis). The first and second collars are positioned respectively axially outboard of the bushing, are journalled on the pin for relative rotation between the first and second collars and the pin, and are fixed respectively to the third and fourth links. The first and second drive caps are positioned respectively axially outboard of the first and second collars, are fixed to the pin, and are configured to engage respectively the first and second sprockets, promoting distribution of loading on the joint, in such an arrangement, the pin and first and second drive caps fixed thereto are rotatable relative to the other components of the joint, the links, and the rest of the track and chain thereof, minimizing wear on the pin and the first and second drive caps.

The above and other features will become apparent from the following description and the attached drawings.

BRIEF DESCRIPTION OF THE DRAWINGS

The detailed description of the drawings refers to the accompanying figures in which.

DESCRIPTION OF THE DRAWINGS

Figure 1:
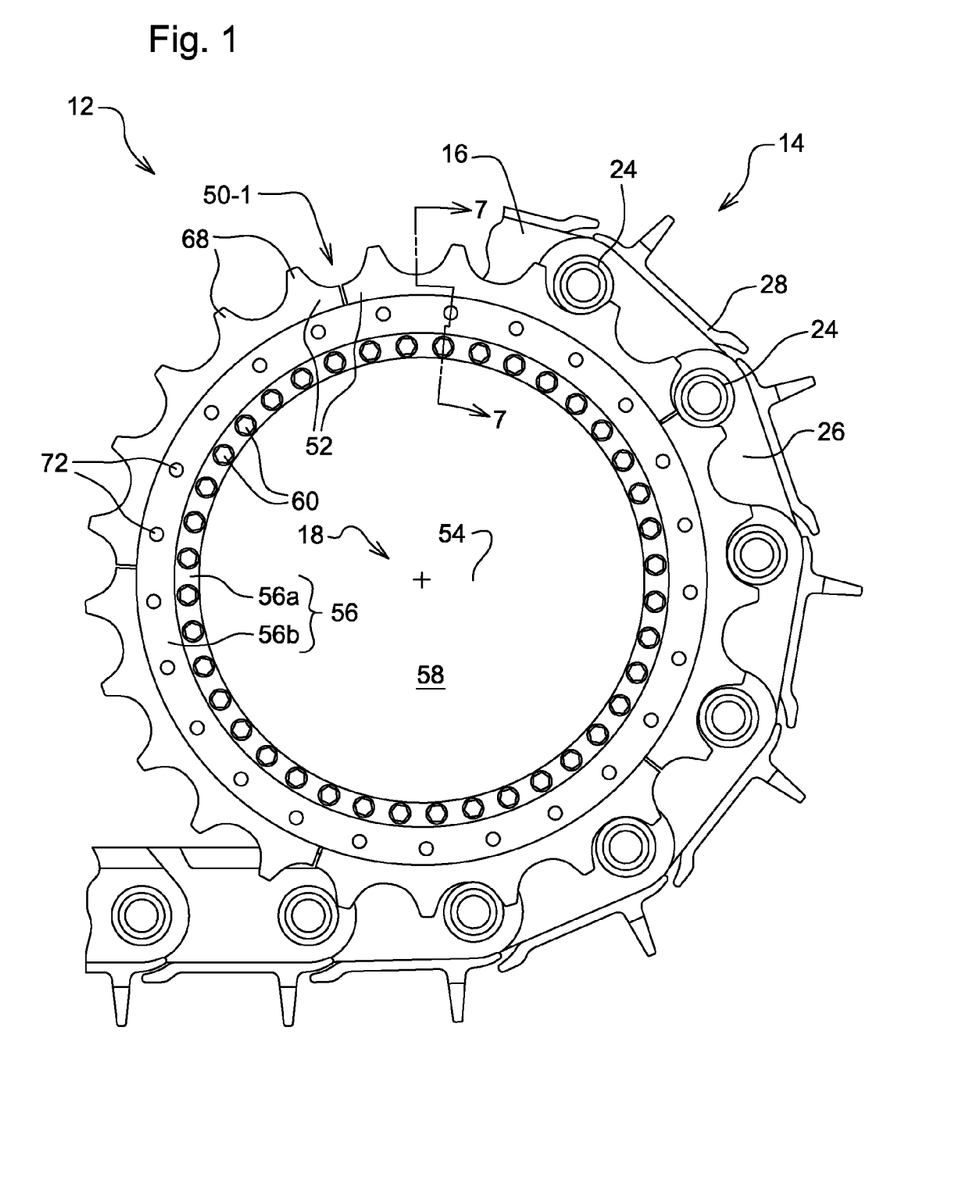
FIG. 1 is side elevation view showing a portion of a track of an undercarriage of a track-type vehicle (e.g., crawler dozer), the track trained about a rear dual-sprocket drive wheel of the undercarriage.

Referring to FIG. 1, there is shown a portion of an undercarriage 12 of a work vehicle. The work vehicle may be, for example, a crawler dozer or any track-type vehicle. The vehicle may include an operator's station from which a human operator can control functions of the vehicle including manipulation of a work implement (e.g., a blade), propulsion and steering, etc.

The undercarriage 12 of the vehicle has a left track assembly and a right track assembly, which are positioned on laterally opposite sides of the vehicle, a portion of the left track assembly being shown in FIG. 1. The track assemblies are provided for propulsion and steering of the vehicle. Each track assembly has a rear dual-sprocket drive wheel 18 attached rotatably to a main frame of the vehicle, a front idler 20, upper and lower rollers attached rotatably to a track frame of the track assembly, and a track 14 trained about the drive wheel 18, the idler 20, and the rollers. The track frame is attached to the main frame and is located between the drive sprocket 18 and the idler 20 within the track 14. A track chain tension adjuster is mounted to the track frame and is attached to the idler 20, movable a distance fore-and-aft relative to the track frame, to press the idler 20 against an endless track chain 16 of the track to tension the chain 16.

Each track 14 includes an endless track chain 16 and ground-engaging shoes 28 attached to the chain 16. The chain 16 includes a number of joints each configured as a replaceable cartridge 24, offset links 26 interconnected by the cartridges 24, and four master links (not shown), two of which are attached to a first cartridge 24 and two of which are attached to a second cartridge 24 such that the master links attached to the first cartridge 24 are respectively attached to he master links attached to the second cartridge 24. Shoes 28 are attached to the links 26 via bolts (not shown) such as, for example, two bolts per link 26 for a total of four bolts per shoe 28 (bolting pattern shown in FIG. 2) (a shoe 28 would also be bolted to the master links). Each cartridge 24 acts as a pivot for links 26 attached to the cartridge 24 and adjacent cartridges 24 on opposite sides thereof. Further, as a wear component, it engages the drive wheel 18 between the teeth thereof and contacts the idler 20 during advancement of the track 14. As discussed in more detail below, each cartridge 24 is assembled as a cartridge before introduction to any of the links 26. The cartridge nature of the cartridge 24 allows the cartridge 24 to be assembled in a controlled environment with tight tolerances, enhancing the leakage resistance and manufacturing repeatability of the joint.

Figure 2:
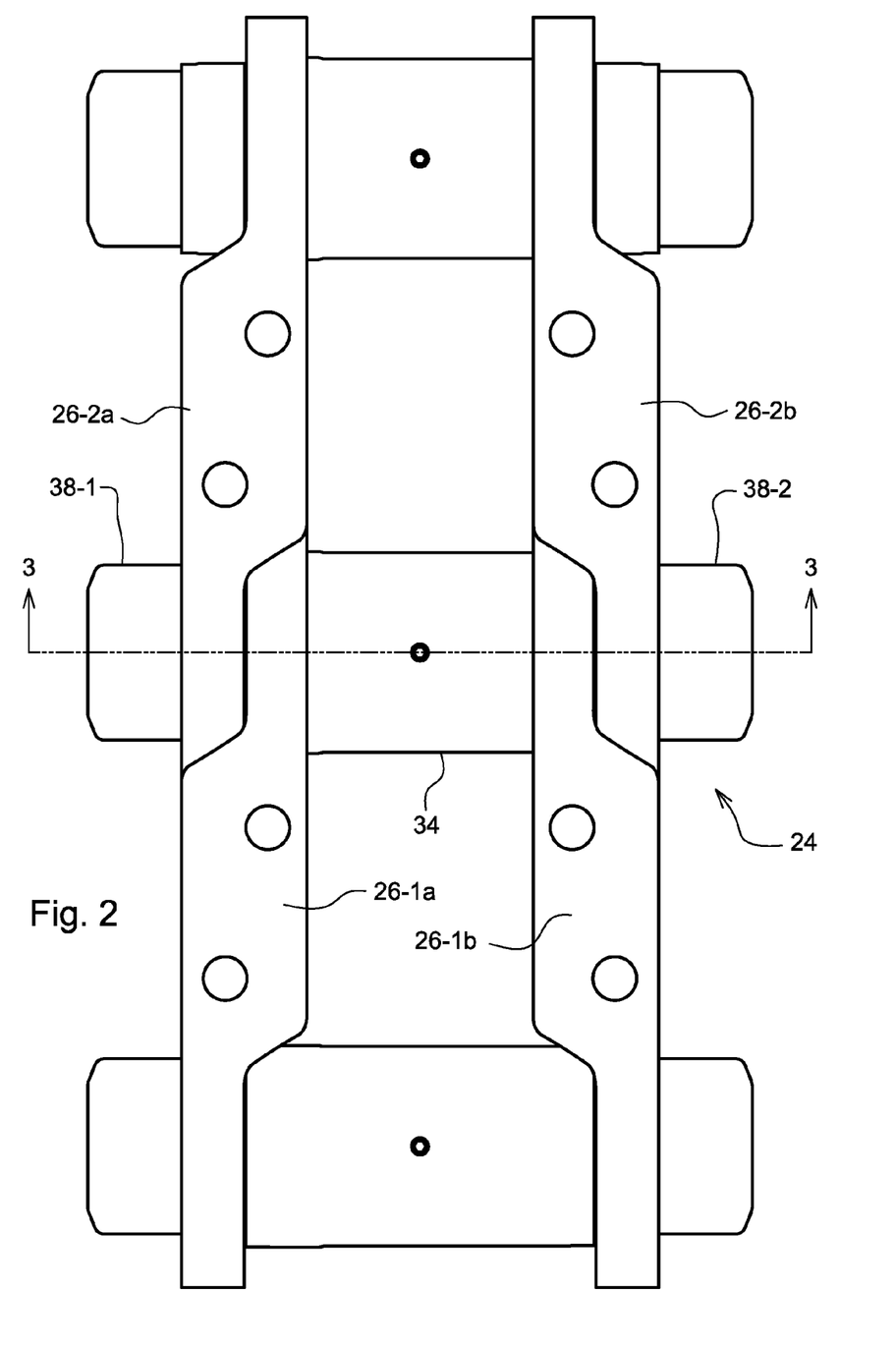
FIG. 2 is a top plan view of a portion of an endless track chain of the track.

Referring to FIG. 2, as it relates to a cartridge 24 and the links 26 attached thereto, terms herein such as "radial" and "axial," and their variants, are relative to a central longitudinal axis 25 of the cartridge 24. A first link 26-1a and a second link 26-1b cooperate to provide a first link set, and a third link 26-2a and a fourth link 26-2b cooperate to provide a second link set. Each cartridge 24 is joined to and distinct from the first link 26-1a, the second link 26-1b, the third link 26-2a, and the fourth link 26-2b for relative rotation between the first link set with its links 26-1a, 26-1b and the second link set with its links 26-2a, 26-2b. A collar of the third link 26-2a is positioned axially outboard of a collar of the first link 26-1a, and a collar of the fourth link 26-2b is positioned axially outboard of a collar of the second link 26-2a.

Figure 3:
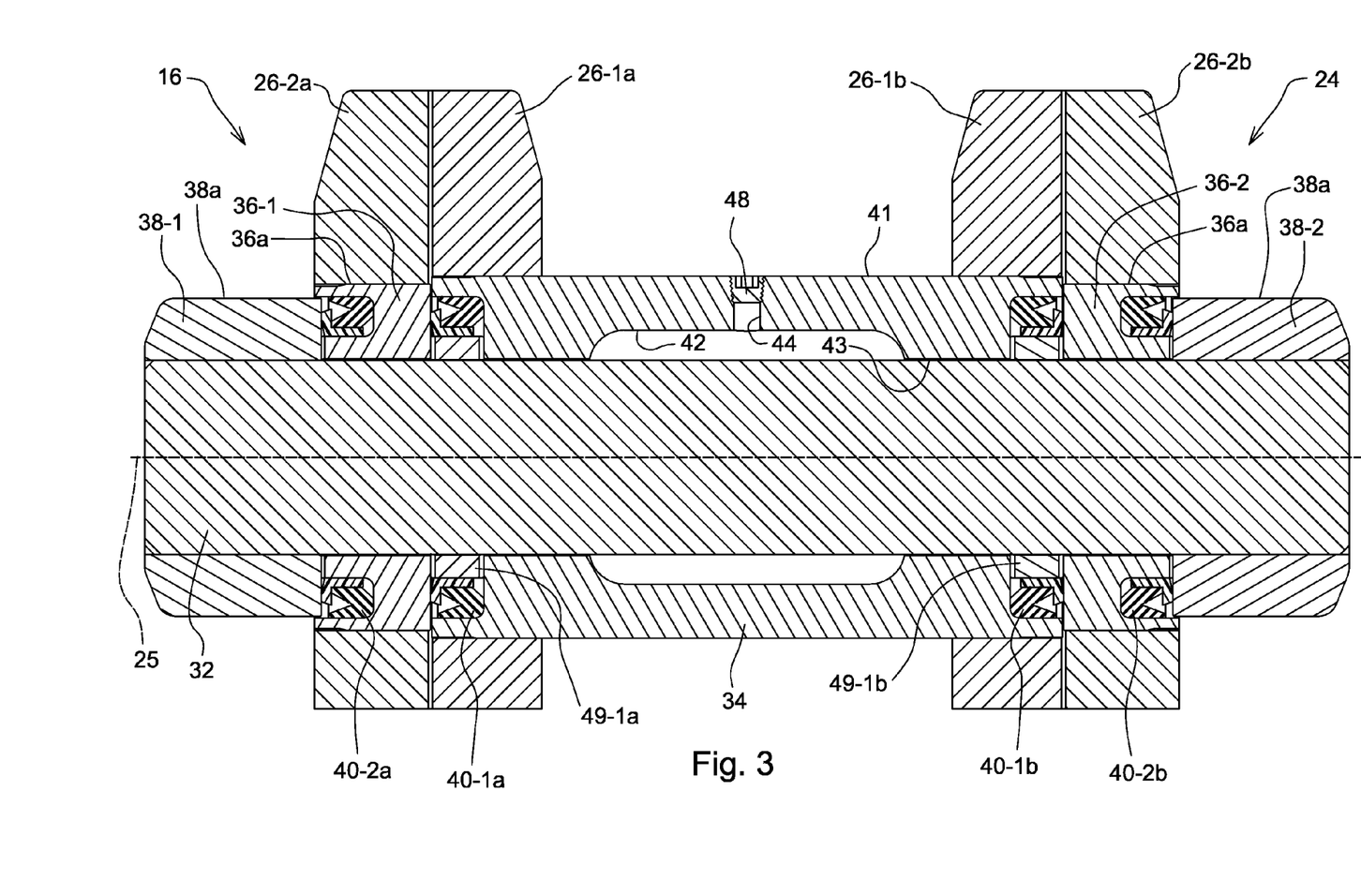
FIG. 3 is a sectional view taken along lines 3-3 of FIG. 2 showing a first embodiment of a replaceable cartridge of the chain.
Figure 4:
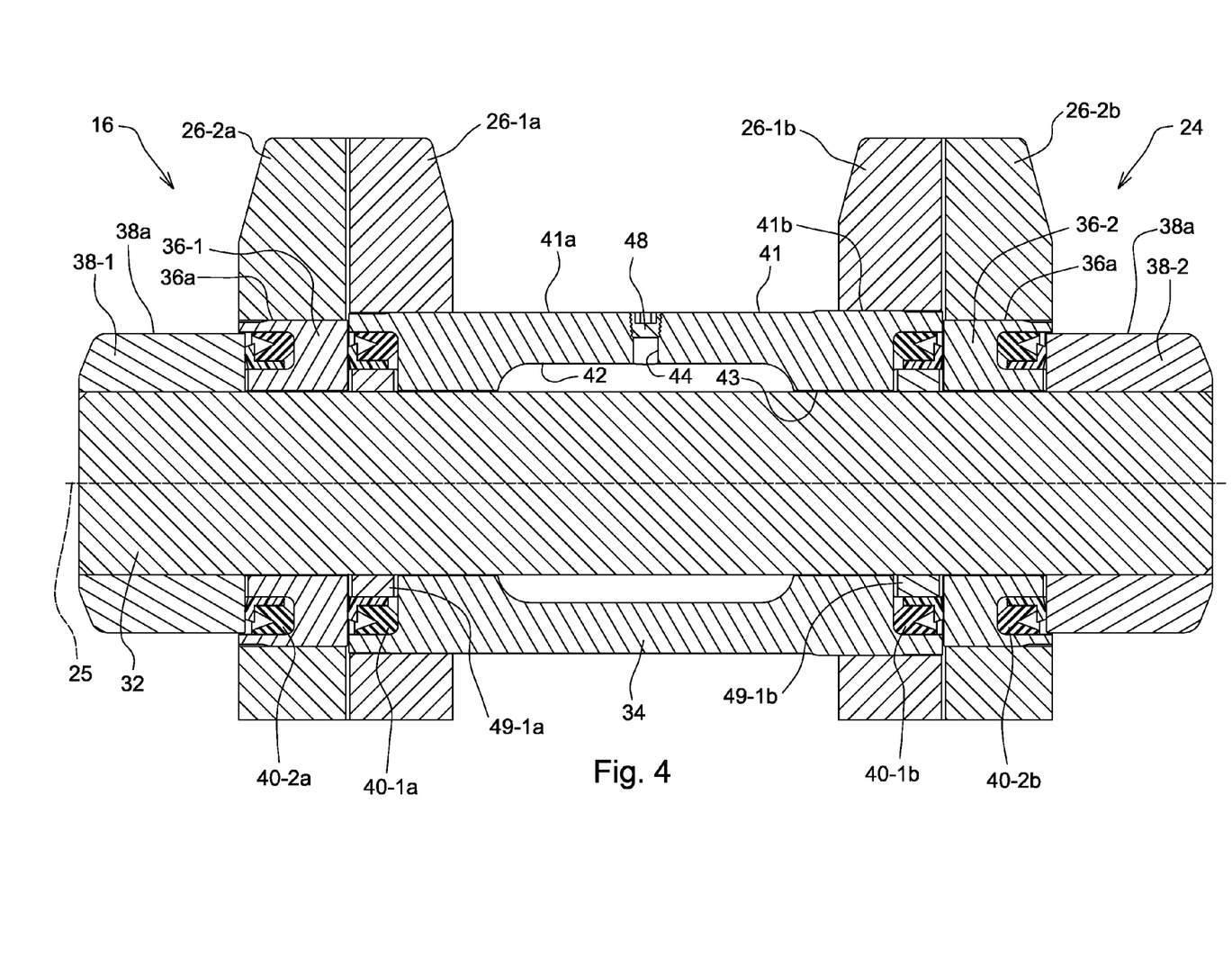
FIG. 4 is a sectional view similar to FIG. 3 showing the cartridge in a modified form.
Figure 5:
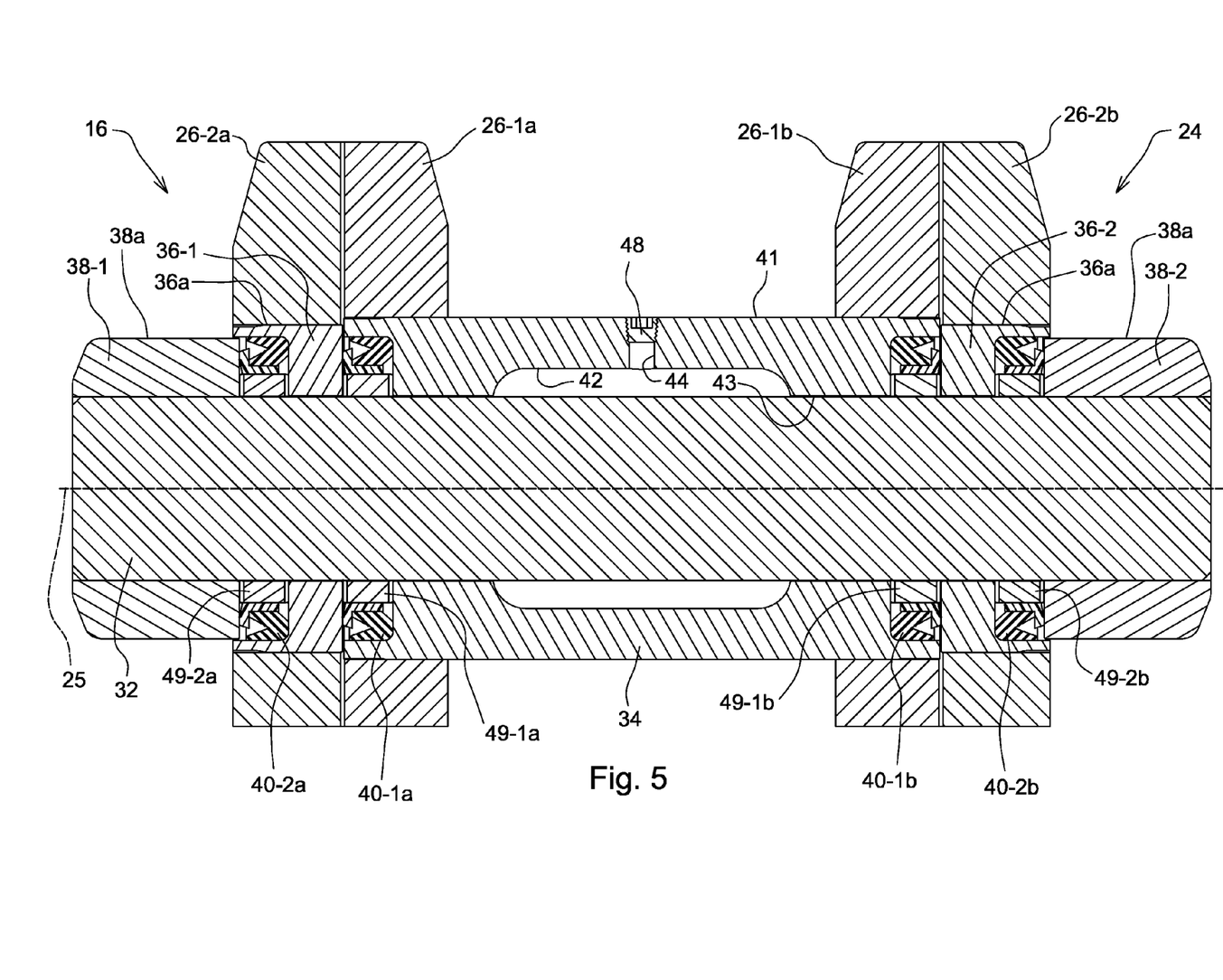
FIG. 5 is a sectional view similar to FIG. 3 showing the cartridge in another modified form.

Referring to FIGS. 3-5, exemplarily, the cartridge 24 includes a freely rotatable pin 32, a bushing 34, a first collar 36-1, a second collar 36-2, a first drive cap 38-1, a second drive cap 38-2, an annular first inboard seal 40-1a, an annular second inboard seal 40-1b, an annular first outboard seal 40-2a positioned axially outboard of the first inboard seal 40-1a, and an annular second outboard seal 40-2b positioned axially outboard of the second inboard seal 40-1b.

The pin 32 is freely rotatable about the axis 25 extending through the center of the pin 32. It is rotatable relative to all the links 26, including the links 26-1a, 26-1b, 26-2a, 26-2b fixed to the cartridge 24 with the pin 32, and relative to the other cartridges 24 of the chain 16.

The pin 32 is cylindrical in shape. More particularly, it is configured as a right circular cylinder having opposite end faces.

The pin 32 is solid. Being solid, it has no internal channels such as a blind axial channel drilled into the pin 32 through an end thereof, for storage and communication of lubricant, eliminating a significant stress concentration in the pin 32 and eliminating the plastic plug and rubber grommet receiving the plastic plug to contain the oil in the axial channel of conventional pins. The pin 32 is thus more homogeneous and less prone to fracture. Without such an axial channel, the outside diameter of the pin 32 can be minimized (e.g., preferably 40.00 millimeters, down from 44.45 millimeters; exemplarily, 40.00 millimeters as with the embodiment of FIG. 3. 44.00 millimeters as with the embodiment of FIG. 4, and 44.00 millimeters as with the embodiment of FIG. 5, such examples to be understood as non-limiting), without a corresponding loss in strength, allowing maximization of the thickness of other components surrounding the pin 32.

The manufacturing tolerance of the length of the pin 32 may be close. The length of the pin 32 is, for example, 293.00 millimeters with a length tolerance of, for example, +/−0.002 inch. Such a close tolerance helps establish the sealing and thus leakage resistance of the cartridge 24 when the other cartridge components are mounted to the pin 32. The ends of the pin 32 are used to position the drive caps 38-1, 38-2 relative to the pin 32, which, in turn, helps to position the other components of the cartridge 24 relative to one another, helping to establish sealing of the cartridge 24.

The bushing 34 is journalled on the pin 32, so as to be radially outward of and surround the pin 32, for relative rotation between the bushing 34 and the pin 32. Opposite end portions of the bushing 34 are fixed respectively to the collars of the first and second links 26-1a, 26-1b, promoting the torsional rigidity of the chain 16. Such fixation occurs, for example, by establishing an interference fit between the end portions of the bushing 34 and the links 26-1a, 26-1b. Each end portion of the bushing 34 includes a radially outer flange with an external annular groove for stress relief of the flange when that end portion is fixed to the respective link 26-1a, 26-1b. Since the links 26-1a, 26-1b are fixed to the bushing 34, the bushing 34 is a structural component of the chain 16.

The outside contour of the bushing 34 may be configured in a variety of ways between the links 26-1a, 26-1b. In the embodiment of FIG. 3, there is an outside diameter surface 41 which extends between the links 26-1a, 26-1b so as to mate with the collars of the links 26-1a, 26-1b, and the outside diameter of the surface 41 is constant (e.g., 82 millimeters), such that the outside contour between the links 26-1a, 26-1b is invariable.

In the embodiment of FIG. 4, the outside contour between the links 26-1a, 26-1b is variable. More particularly, the bushing 34 in that embodiment has a first outside diameter surface 41a that mates with the collar of the first link 26-1a and has a first outside diameter (e.g., 82.00 millimeters), and a second outside diameter surface 41b that mates with the collar of the second link 26-1b and has a second outside diameter (e.g., 83 millimeters) larger than (e.g., one millimeter) the first outside diameter to facilitate detachment of the bushing 34 from the links 26-18, 26-1b during removal of the cartridge 24 therefrom, discussed in more detail below.

The bushing 34 includes a lubricant reservoir 42 for storage of lubricant (e.g., oil such as an 80W90-type of oil, which may have additives) that lubricates various interfaces of the cartridge 24. The reservoir 42 is configured, for example, as an annular recess defined in an inside diameter surface 43 of the bushing 34 and arranged for fluid communication with a lubricant-fill channel 44 extending from the outside diameter surface 41 to the inside diameter surface 43. The channel 44 is arranged toward the inside portion of the chain 16 for purposes of stress management (i.e., the inside portion being the portion that engages the drive wheel 18 and contacts the idler 20 and rollers). A plug 48 (e.g., a standard ⅛ inch National Pipe Thread steel plug, used in hydraulic applications, with a standard hexagonal head and threaded body with a standard taper) is positioned in the lubricant-fill channel 44 to contain lubricant in the reservoir 42. Lubricant can be introduced into the reservoir 42 via the channel 44 upon removal of the plug 48.

Given elimination of an axial channel from the pin 32, the thickness of the wall of the bushing 34 between the inside and outside diameters can be maximized, providing the reservoir 42 with a large volume for increased lubricant capacity (e.g., reservoir volume doubled). The inside diameter of the reservoir 42 is, for example, 57.50 millimeters. The inside diameter of the bushing 34 (i.e., at the interface with the pin 32) is, for example, 44.30 millimeters, with nominal minimum inside diameter, for example, of 44.00 millimeters, with 0.30 millimeters added for clearance with pin 32.

As a preventative feature, a normally plugged secondary channel could be provided in the bushing 34 diametrically opposite the channel 44 so as to extend radially through the bushing 34 from the inside diameter surface 43 to the outside diameter surface 41. The secondary channel could be used to flush the lubricant from the cartridge 24. Such a feature may be particularly useful to clean out the cartridge 24, when, for example, the cartridge 24 tends to leak, and may be particularly useful on larger or other vehicles.

The collars 36-1, 36-2 are positioned respectively axially outboard of the bushing 34, and are journalled on the pin 32 for relative rotation between the collars 36-1, 36-2 and the pin 32. The collars 36-1, 36-2 are positioned radially outward of and surround the pin 32.

The collars 36-1, 36-2 are fixed respectively to the third and fourth links 26-2a, 26-2b. More particularly, an outside diameter surface 36a of each collar 36-1, 36-2 is fixed to and mates with the collar of the respective link 26-1a, 26-1b. Such fixation occurs, for example, by establishing an interference fit between the collars 36-1, 36-2 and the links 26-2a, 26-2b. Each collar 36-1, 36-2 includes a radially outer flange with an external annular groove for stress relief of the flange when that collar 36-1, 36-2 is fixed to the respective link 26-2a, 26-2b. Since the bushing 34 is fixed to the first and second links 26-1a, 26-1b and the collars 36-1, 36-2 are fixed respectively to the third and fourth links 26-2a, 26-2b, the collars 36-1, 36-2 and the bushing 34 are arranged for relative rotation between the collars 36-1, 36-2 and the bushing 34 for relative rotation between the first link set and the second link set.

The collars 36-1, 36-2 may be configured in a variety of ways. For example, in the embodiments of FIGS. 3 and 4, each collar 36-1, 36-2 has a radially inner flange that acts as a thrust washer, whereas, in the embodiment of FIG. 5, each collar 36-1, 36-2 has no such flange and there is an annular thrust washer 49-2a, 49-2b in lieu thereof. Inclusion of such flange in each collar 36-1, 36-2 maximizes bearing contact between the collar 36-1, 36-2 and the pin 32, so as to distribute the loading from the collar 36-1, 36-2 on the pin 32, minimizing corresponding stress on the pin 32 such as when the chain 14 becomes tight.

The first and second inboard seals 40-1a, 40-1b are positioned axially between the bushing 34 and the first and second collars 36-1, 36-2. Each seal 40-1a, 40-1b sealingly contacts the bushing 34 and the respective collar 36-1, 36-2 so as to minimize leakage of lubricant from the cartridge 24 and ingress of material into the cartridge 24. The seal 40-1a is positioned in a counterbore of the bushing 34 radially between the radially outer flange of a first end portion of the bushing 34 and an annular thrust washer 49-1a positioned axially between the first collar 36-1 and the bushing 34. The seal 40-1b is positioned in a counterbore of the bushing 34 radially between the radially outer flange of a second end portion of the bushing 34 and an annular thrust washer 49-1b positioned axially between the second collar 36-2 and the bushing 34.

The thrust washers 49-1a, 49-1b space the bushing 34 and the respective collars 36-1, 36-2 apart from one another. The washers 49-1a, 49-1b optimize respectively the seal height of the seals 40-1a, 40-1b. Further, during assembly of the cartridge 24, the washers 49-1a, 49-1b space bushing 34 and collars 36-1, 36-2 relative to one another so as to establish respectively the correct pre-load on the seals 40-1a, 40-1b. The washers 49-1a, 49-1b are journalled on the pin 32, so as to be positioned radially outward of and surround the pin 32, for relative rotation between the washers 49-1a, 49-1b and the pin 32. The washers 49-1a, 49-1b cooperate with the bushing 34 and the respective collars 36-1, 36-2 to establish a lubricated slidable contact zone therebetween. Given elimination of an axial channel from the pin 32, the thickness of the washes 49-1a, 49-1b can be maximized, such as, for example, with respect to the oversized washers 49-1a, 49-1b in the embodiment of FIG. 4, promoting the strength of the washers 49-1a, 49-1b.

Figure 6:
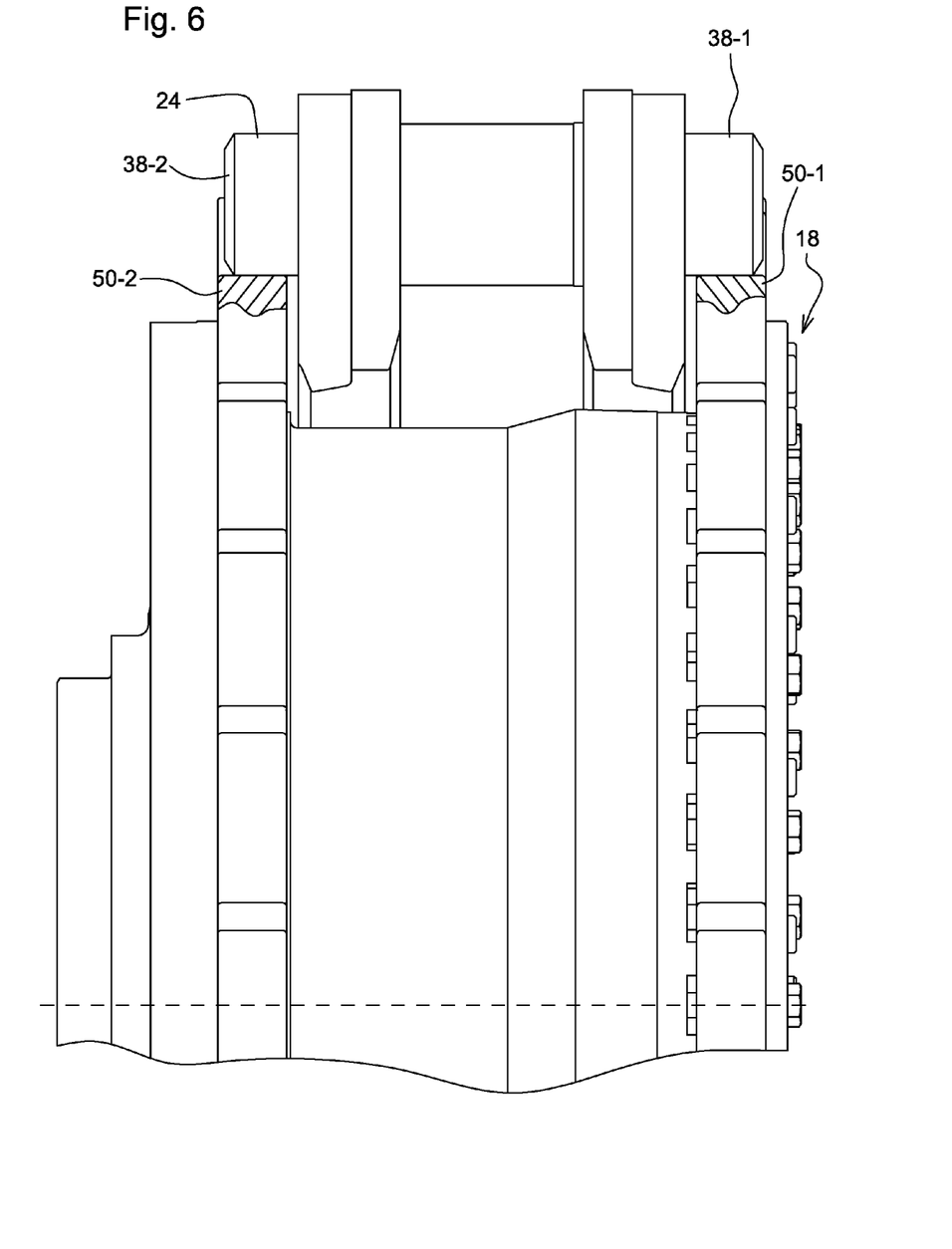
FIG. 6 is a sectional view showing engagement of the cartridge with first and second sprockets of the drive wheel.

The first and second drive caps 38-1, 38-2 are positioned respectively axially outboard of the first and second collars 36-1, 36-2, are fixed to the pin 32, and are configured to engage respectively first and second sprockets 50-1, 50-2 of the drive wheel 18 (see FIG. 6). The drive caps 38-1, 38-2 are press-fitted onto the pin 32 so as to establish an interference fit therebetween. The press-engagement length of each cap 38-1, 38-2 onto the pin 32 is maximized so that a positive pin retention method (e.g., locking ring) or welding of the cap 38-1, 38-2 onto the pin 32 is not needed. The drive caps 38-1, 38-2 cooperate to capture therebetween the bushing 34, the collars 36-1, 36-2, seals 40-1a, 40-1b, 40-2a, 40-2b, thrust washers 49-1a, 49-1b, and thrust washers 49-2a, 49-2b, as the case may be. The drive caps 38-1, 38-2 are, for example, through-hardened so as to have a hardness level of, for example, 48-52 HRc (Hardness Rockwell C).

Each drive cap 38-1, 38-2 is configured, for example, as a lug shaped as a collar that has a cylindrical outside diameter surface 38a (e.g., diameter of 72 millimeters) and a rounded radially outer, axially outboard corner and that is flush with a respective end face of the pin 32. In alternative embodiments, each drive cap 38-1, 38-2 may have, in addition to its collar, a cover closing one end of the collar, akin to a bottle cap. In still other embodiments, the outside diameter surface 38a may be conical (e.g., frusto-conical), regardless whether the cap 38-1, 38-2 is configured as a simple collar flush with the respective pin end face or as a collar and cover.

The first and second outboard seals 40-2a, 40-2b are positioned respectively axially between the first and second collars 36-1, 36-2 and the first and second drive caps 38-1, 38-2. Each seal 40-2a, 40-2b sealingly contacts the respective collar 36-1, 36-2 and the respective drive cap 38-1, 38-2 so as to minimize leakage of lubricant from the cartridge 24 and ingress of material into the cartridge 24. The seal-contact surfaces of the drive caps 38-1, 38-2 that contact respectively the lips of the seals 40-2a, 40-2b and the seal-contact surfaces of the collars 36-1, 36-2 that contact respectively the lips of the seals 40-1a, 40-1b are surface-finished, for example, by lapping to achieve a surface roughness of, for example, approximately four to eight micro-inches Ra. In such a case, the lapping compound is mixed with a fluid (wet process) and the surface is brought to the desired level of surface finish as a function time and compound grit size.

The outboard seals 40-2a, 40-2b may be mounted in a variety of ways. For example, in the embodiments of FIGS. 3 and 4, the seal 40-2a is positioned in an annular groove formed in the collar 36-1 between the radially outer and inner flanges of the collar 36-1, and the seal 40-2b is positioned in an annular groove formed in the collar 36-2 between the radially outer and inner flanges of the collar 36-2. The radially inner flanges of the collars 36-1, 36-2 optimize respectively the seal heights of the seals 40-2a, 40-2b. In the embodiment of FIG. 5, the seal 40-2a is positioned in a counterbore of the collar 36-1 between the radially outer flange of the collar 36-1 and a thrust washer 49-2a positioned axially between the first collar 36-1 and the first drive cap 38-1, and the seal 40-2b is positioned in a counterbore of the collar 36-2 between the radially outer flange of the collar 36-2 and a thrust washer 49-2b positioned axially between the second collar 36-2 and the second drive cap 38-2. The washers 49-2a, 49-2b optimize respectively the seal height of the seals 40-2a, 40-2b.

Each seal 40-1a, 40-1b, 40-2a, 40-2b includes an annular seal loading element, made of, for example, nitrile rubber, and an annular seal body loaded by the seal loading element to contact a respective component to establish a sealed connection therebetween and made, for example, of polyurethane.

Figures 8, 9, 10:
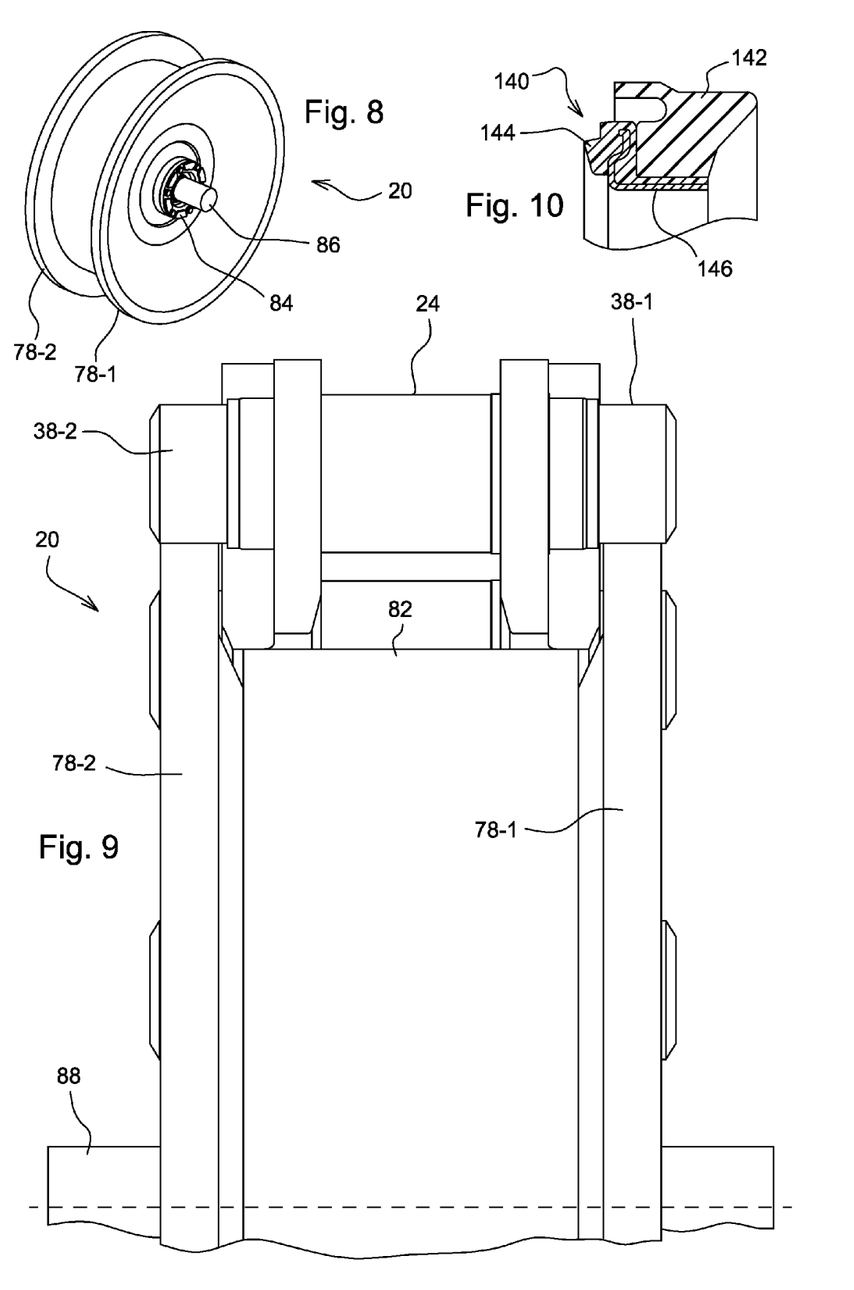
FIG. 8 is a perspective view of a dual-rim idler for use in the track-type vehicle.
FIG. 9 is an end elevation view showing contact of a cartridge with first and second rims of the idler.
FIG. 10 is a cross-sectional view of an alternative seal.

Referring to FIG. 10, each seal 40-1a, 40-1b, 40-2a, 40-2b may be configured as a seal 140. Seal 140 includes an annular seal loading element 142 (made, for example, of 176 nitrile), an annular seal body 144 (made, for example, of polyurethane), and an annular plate 146 (made, for example, of SAE 1006-1008 steel). The seal body 144 is loaded by the loading element 142 to contact a respective component to establish a sealed connection therebetween. The plate 146, a portion of which is embedded in the seal body 144, stiffens the seal body 144 and contacts a respective component (e.g., a respective thrust washer or collar).

The spacing between the collars 36-1, 36-2 and the drive caps 38-1, 38-2 may thus be established in a variety of ways, promoting the sealed connection therebetween. In the embodiments of FIGS. 3 and 4, during assembly of the cartridge 24, the radially inner flanges of the collars 36-1, 36-2 space the collars 36-1, 36-2 relative to the drive caps 38-1, 38-2 so as to establish respectively the correct pre-load on the seals 40-1a, 40-1b. Further, they cooperate respectively with the drive caps 38-1, 38-2 to establish a lubricated slidable contact zone therebetween. Given elimination of an axial channel from the pin 32, the thickness of the radially inner flanges of the collars 36-1, 36-2 can be maximized, such as, for example, with respect to the oversized radially inner flanges of the collars 36-1, 36-2 in the embodiment of FIG. 4, promoting the strength of the collars 36-1, 36-2.

In the embodiment of FIG. 5, the thrust washers 49-2a, 49-2b space the collars 36-1, 36-2 respectively apart from the drive caps 38-1, 38-2. Further, during assembly of the cartridge 24, the washers 49-2a, 49-2b space collars 36-1, 36-2 relative to the drive caps 38-1, 38-2 so as to establish respectively the correct pre-load on the seals 40-2a, 40-2b. The washers 49-2a, 49-2b are journalled on the pin 32, so as to be positioned radially outward of and surround the pin 32, for relative rotation between the washers 49-2a, 49-2b and the pin 32. The washers 49-1a, 49-1b cooperate with the respective collars 36-1, 36-2 and the respective drive caps 38-1, 38-2 to establish a lubricated slidable contact zone therebetween. Given elimination of an axial channel from the pin 32, the thickness of the washers 49-2a, 49-2b can be maximized, such as, for example, with respect to the oversized washers 49-2a, 49-2b in the embodiment of FIG. 4, promoting the strength of the washers 49-2a, 49-2b. In both spacing methods, the radially outer flanges of the collars 36-1, 36-2 are spaced respectively apart from the drive caps 38-1, 38-2.

During assembly of the cartridge 24, the bushing 34, the collars 36-1, 36-2, and the drive caps 38-1, 38-2 are mounted onto the pin 32 in axially sequential order. First, one of the drive caps 38-1, 38-2 is press-fitted onto the pin 32 at an end portion thereof. Consider, for example, the first drive cap 38-1 as the drive cap which is attached first. In such a case, the drive cap 38-1 is press-fitted onto a first end portion of the pin 32 using a hydraulic press such that the drive cap 38-1 is flush with the end face of that end portion of the pin 32. When the hydraulic press contacts that end face, it ceases to push the drive cap 38-1 onto the pin 32.

The first collar 36-1, with the seal 40-2a and the thrust washer 49-2a, as the case may be, pre-assembled to the collar 36-1, is then slid onto the pin 32 from the opposite second end portion of the pin 32, followed by the bushing 34, with the seals 40-1a, 40-1b and thrust washers 49-1a, 49-1b pre-assembled to the bushing 34, and then the second collar 36-2, with the seal 40-1b and the thrust washer 49-1b, as the case may be, pre-assembled to the collar 36-2. Finally, the second drive cap 38-2 is press-fitted onto the second end portion of the pin 32 using a hydraulic press such that the drive cap 38-2 is flush with the end face of the second end portion of the pin 32. When the hydraulic press contacts that end face, it ceases to push the drive cap 38-2 onto the pin 32.

In embodiments where each cap 38-1, 38-2 has a cover to close an end of its collar, during installation of the cap 38-1, 38-2 onto the pin 32 using a hydraulic press, the cover of the cap 38-1, 38-2 would abut the respective end face of the pin 32, covering that end face and ceasing further movement of the cap 38-1, 38-2 onto the pin 32.

Considering that the length of the pin 32 is within a tight tolerance, the end faces of the end portions of the pin 32 thus act as positioners for positioning the drive caps 38-1, 38-2 on the pin 32, thereby establishing the sealed connections between the seals 40-1a, 40-1b, 40-2a, 40-2b and the bushing 34, collars 36-1, 36-2, and drive caps 38-1, 38-2 in a controlled and reliable manner.

Lubricant can be added to the cartridge 24 before or after attachment of the cartridge 24 to the links 26-1a, 26-1b, 26-2a, 26-2b. The lubricant lubricates the sliding interfaces of the cartridge 24, including the interfaces between the bushing 34 and the pin 32, between the collars 36-1, 36-2 and the pin 32, between the thrust washers 49-1a, 49-1b and the bushing 34 and collars 36-1, 36-2, and, as the case may be, between the collars 36-1, 36-2 and the drive caps 38-1, 38-2 or between the thrust washers 49-2a, 49-2b and the collars 36-1, 36-2 and drive caps 38-1, 38-2.

During assembly of the chain 16, the links 26-1a, 26-1b, 26-2a, 26-2b are joined to the pre-assembled cartridge 24 using a hydraulic press. A collar of the link 26-1b is pressed onto the second end portion of the bushing 34, so that the outside diameter surface 41 or 41b, as the case may be, mates with the collar of the link 26-1b, establishing an interference fit therebetween, after which a collar at an opposite end of the link 26-1b is pressed onto the collar 36-2 of a first adjacent cartridge 24. A collar of the link 26-1a is then pressed onto the first end portion of the bushing 34, so that the outside diameter surface 41 or 41a, as the case may be, mates with the collar of the link 26-1a, establishing an interference fit therebetween; simultaneously, a collar at an opposite end of the link 26-1a is pressed onto the collar 36-1 of the first adjacent cartridge 24. Next, a collar of the link 26-2b is pressed onto the second collar 36-2, so that the outside diameter surface 36a of the second collar 36-2 mates with the collar of the link 26-2b, establishing an interference fit therebetween, this step occurring after pressing a collar at an opposite end of the link 26-2b onto the second end portion of the bushing 34 of a second adjacent cartridge 24. Finally, the collar of the link 26-2a is pressed onto the first collar 36-1, so that the outside diameter surface 36a of the first collar 36-1 mates with the collar of the link 26-2a, establishing an interference fit therebetween; simultaneously, a collar at an opposite end of the link 26-2a is pressed onto the first end portion of the bushing 34 of the second adjacent cartridge 24.

This operation is repeated for each of the cartridges 24 (establishing a pitch of, for example, 203 millimeters) except for two cartridges 24 which are joined by four master links. Two of the master links are joined to the bushing 34 of one of the cartridges 24, and the other two master links are joined to the collars 36-1, 36-2 of the other cartridge 24. The master links joined to the bushing 34 of the first cartridge 24 are joined respectively to the master links joined to the collars 36-1, 36-2 of the second cartridge 24.

To facilitate such assembly of the cartridge 24 to the links 26-1a, 26-1b, 26-2a, 26-2b, the cartridge 24 may have a variable outside diameter. More particularly, the outside diameter of the outside diameter surface 36a of the collars 36-1, 36-2 is greater than the outside diameter of the outside diameter surface 38a of the drive caps 38-1, 38-2, and the outside diameter of the outside diameter surface 41, 41a or 41b, as the case may be, of the bushing 34 is greater than the outside diameter of the outside diameter surface 36a of the collars 36-1, 36-2. The outside diameter of the cartridge 24 thus tapers as the cartridge 24 extends axially outwardly from the bushing 34 toward the drive caps 38-1, 38-2, allowing the first and third links 26-1a, 26-2a to be slipped over the first drive cap 38-1 during attachment of those links 26-1a, 26-2a to the cartridge 24 and the second and fourth links 26-1b, 26-2b to be slipped over the second drive cap 38-2 during attachment of those links 26-1b, 26-2b to the cartridge 24.

Alternatively, in the embodiment of FIG. 4 in which the bushing 34 has a variable outside contour with surfaces 41a and 41b, the outside diameters of the collars 36-1, 36-2 may be different from one another. For example, the outside diameter of the surface 36a of the second collar 36-2 may be larger than the outside diameter of the surface 36a of the first collar 36-1, while the outside diameters of the surfaces 38a of the drive caps 38-1, 38-2 may be the same as one another and smaller than the outside diameters of the of the surfaces 36a of the collars 36-2, 36-2, allowing the first, second, and third links 26-1a, 26-1b, 26-2a to be slipped over the first drive cap 38-1 during attachment of those links 26-1a, 26-1b, 26-2a to the cartridge 24 and the fourth link 26-2b to be slipped over the second drive cap 38-2 during attachment of that link 26-2b to the cartridge 24. Further, such an arrangement would facilitate disassembly of the cartridge 24 from the links 26-1a, 26-1b, 26-2a, 26-2b as discussed below.

The cartridge 24 would be replaceable by a fresh cartridge 24 (new or re-conditioned) in the field, maintenance shop, or other location, when, for example, it has become worn.

To disassemble the cartridge 24 from the links 26-1, 26-1b, 26-2a, 26-2b, in the embodiments of FIGS. 3-5, the pin 32 is pushed out of the bushing 34, the collars 36-1, 36-2, and the drive cap 38-1 using a hydraulic press (e.g., to the right in FIGS. 3-5). The drive cap 38-2 would remain on the pin 32 during this step for subsequent pushing of the pin 32 out of the drive cap 38-2 if desired. The bushing 34 and collars 36-1, 36-2 may then be individually pushed out of the respective links 26-1a, 26-1b, 26-2a, 26-2b using a hydraulic press. Using a hydraulic press, the bushing 34 may be separated from the links 26-1a, 26-11b by pushing the bushing 34 in one direction through both links 26-1a, 26-1b, such as to the right in FIGS. 3-5, or initially in one direction to separate the bushing 34 from one of the links 26-1a, 26-1b and then in the opposite direction to separate the bushing 34 from the other links 26-1a, 26-1b.

To minimize external scoring on the bushing 34 during such a separation operation, the bushing 34 may have the two outside diameter surfaces 41a, 41b with different outside diameters, as in the embodiment of FIG. 4. As such, once the outside diameter surfaces 41a, 41b are released from the respective links 26-1a, 26-1b, the smaller outside diameter surface 41a can be moved freely through the link 26-1b to complete separation of the bushing 34 from the links 26-1a, 26-1b.

In the alternative embodiment (not shown) where the outside diameter of the collar 36-2 is larger than the outside diameter of the collar 36-1 and the bushing 34 has the outside contour of the embodiment of FIG. 4 with its surfaces 41a, 41b, the entire cartridge 24 could be pushed out of the links 26-1a, 26-1b, 26-2a, 26-2b as a single unit using a hydraulic press. Such an arrangement would minimize scoring on the components 34, 36-1, 36-2.

During replacement, in the embodiments of FIGS. 3-5, fresh components (e.g. new or re-conditioned) of the ones removed (some may have been left attached to the links if still in adequate condition) are assembled to the respective links 26-1a, 26-1b, 26-2a, 26-2b in reverse order and direction from the way they were disassembled from the links 26-1a, 26-1b, 26-2a, 26-2b using a hydraulic press so as to build a fresh replacement cartridge 24. The different outside diameters of the surfaces 41a, 41b would facilitate such re-assembly to the links 26-1a, 26-2a, 26-1b, 26-2b.

In the embodiment where the entire cartridge 24 is removed from the links 26-1a, 26-1b, 26-2a, 26-2b as a single unit, a fresh cartridge 24 can be installed in its place by pushing the fresh cartridge 24 into the links 26-1a, 26-1b, 26-2a, 26-2b using a hydraulic press in the opposite direction from the way the worn cartridge 24 came out. The different outside diameters of the surfaces 41a, 41b and the different outside diameters of the surface 36a of the collars 36-1, 36-2 would facilitate such re-assembly to the links 26-1a, 26-1b, 26-2a, 26-2b.

The thrust washers 49-1a, 49-1b and the radially inner flanges of the collars 36-1, 36-2, or the thrust washers 49-2a, 49-2b, as the case may be, are sized to permit cartridge disassembly and possible replacement in the field, as they take the brunt of the load during such disassembly and replacement operations.

The drive wheel 18 is rotatable about an axis of rotation 51. Thus, as it relates to the drive wheel 18, terms herein such as "radial" and "axial," and their variants, are relative to the wheel axis 51.

Referring to FIG. 6, the drive wheel 18 has the annular first sprocket 50-1 and the annular second sprocket 50-2. Since there are two sprockets 50-1, 50-2 instead of only one, each sprocket 50-1, 50-2 can be thinner than the sprocket of a single-sprocket design. Each sprocket 50-1, 50-2 has a thickness of, for example, 35.00 millimeters. Each sprocket 50-1, 50-2 includes a plurality of one-piece metal sprocket segments arranged end-to-end to form the annulus of the sprocket 50-1, 50-2.

Figure 7:
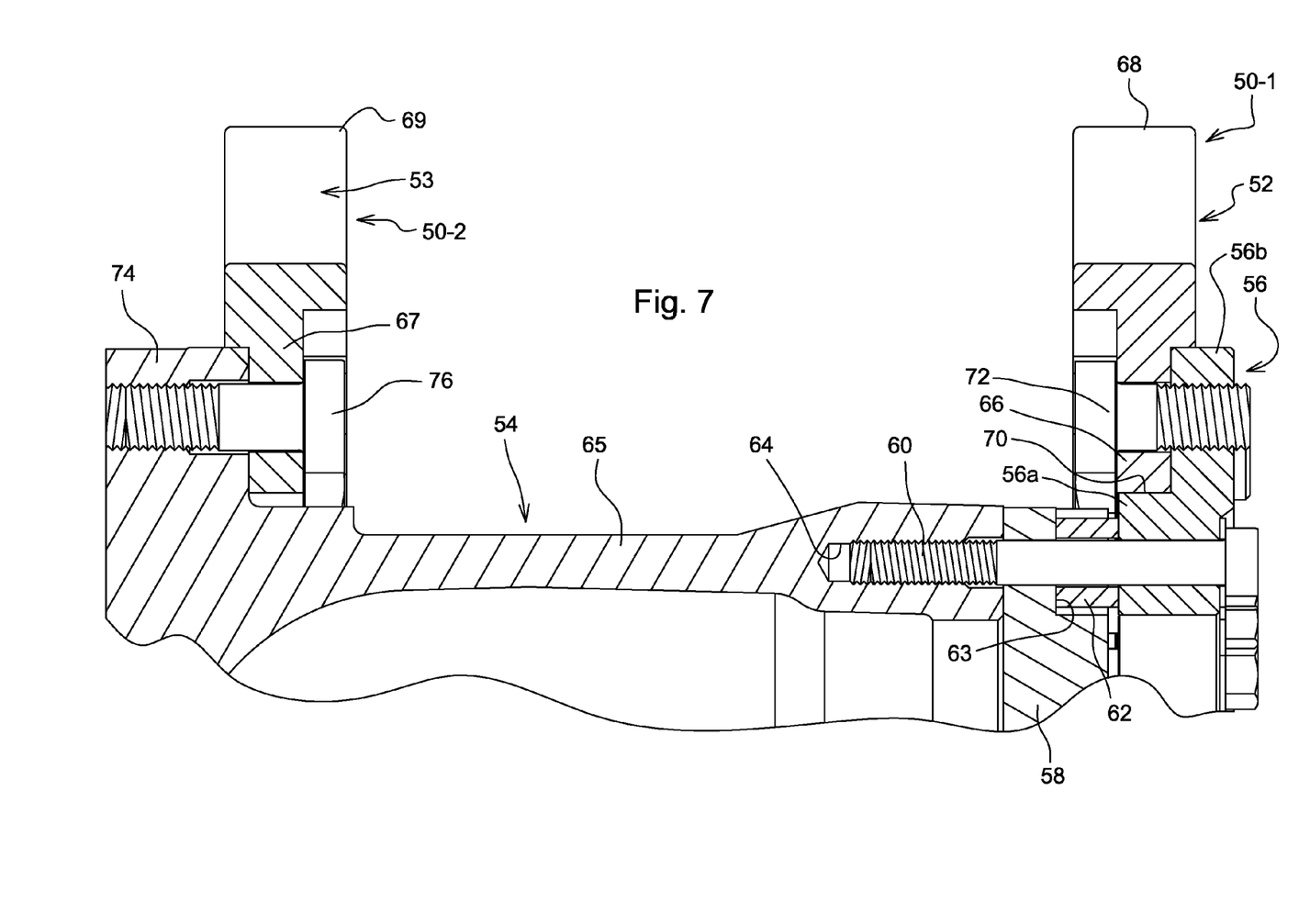
FIG. 7 is a sectional view taken along lines 7-7 of FIG. 1 showing mounting of the first sprocket of the drive wheel.

Referring to FIGS. 1 and 7, the sprocket segments 52 of the sprocket 50-1 are removably mounted to a hub 54 of the wheel 18 via a removable mounting ring 56. The ring 56 is a one-piece metal member having a radially inner portion 56a and a radially outer portion 56b stepped axially inwardly from the outer portion 56a.

The inner portion 56a is removably mounted to a circular metal plate 58 of the hub 54 using fasteners 60 (e.g., cap screws). The inner portion 56a, and thus the mounting ring 56, is spaced apart from the plate 58 using annular metal spacers 62 positioned in respective notches 63 formed in the plate 58 and spaced evenly along the periphery of the plate 58. Each fastener 60 extends through the inner portion 56a, a respective spacer 62, and the plate 58 into a blind hole 64 of a metal housing 65 of the hub 54 to mount the ring 56 to the hub 54.

The sprocket segments 52 of the sprocket 50-1 are removably mounted to, and positioned circumferentially about, the outer portion 56b. Each sprocket segment 52 has a root 66 and one or more teeth 68 supported on the root 66. Each segment 52 of the sprocket 50-1 is removably mounted to the outer portion 56b using fasteners 72 extending through the outer portion 56b and the root 66 of the segment 52.

Referring to FIG. 7, the sprocket segments 53 of the sprocket 50-2 are removably mounted to, and positioned circumferentially about, an annular mounting flange 74 integral with and extending radially outwardly from the housing 65. Each sprocket segment 53 has a root 67 and one or more teeth 69 supported on the root 67. Each segment 53 of the sprocket 50-2 is removably mounted to the flange 74 using fasteners 76 extending through the root 67 of the segment 53 and the flange 74. Exemplarily, the sprocket segments 52, 53 are the same part.

Referring to FIGS. 8 and 9, the idler 20 has two rims 78-1, 78-2 which the drive caps 38-1, 38-2 contact respectively. Each rim 78-1, 78-2 is provided by a radially extending flange of a respective disk of the idler 20. The disks are fixed to a hub of the idler 20 for rotation of the idler 20 about its rotation axis defined by a shaft 86 received by the hub 84.

Alternatively, the idler 20 could take the form of, for example, an idler with a single rim. A pair of rails of the chain 16, provided by the links of the chain 16, may ride on the rim on either side of an annular central ridge of the rim, as with many conventional idlers or the idlers disclosed in U.S. patent application Ser. No. 12/257,733 filed on 24 Oct. 2008, the disclosure of which is hereby incorporated by reference herein, in another example, the bushing 34 may ride on the central ridge, as in U.S. Pat. No. 5,829,849, the disclosure of which is hereby incorporated by reference herein.

Whether the idler 20 is configured as a double-rim idler or a single-rim idler, the rim(s) thereof may be sprocketed so as to have teeth (not shown), as in or similar to U.S. Pat. No. 6,250,726, the disclosure of which is hereby incorporated by reference herein. Sprocketed rim(s) may help to alleviate contact stresses between the idler 20 and the drive caps 38-1, 38-2. In the case of a double-rim idler, the rims 78-1, 78-2 may be sprocketed (e.g., the periphery of the disk of each rim 78-1, 78-2) so as to have radial protrusions or teeth about the periphery thereof, and the drive caps 38-1, 38-2 would engage respectively the teeth of the rims 78-1, 78-2, and, in the case of a single-rim idler with a single sprocketed rim, the bushing 34 would engage the teeth of that rim. Further, the rim(s) of the idler 20 may be segmented, as in or similar to U.S. Pat. Nos. 6,250,726, 5,829,849, or U.S. patent application Ser. No. 12/257,733 filed on 24 Oct. 2008.

Referring back to FIGS. 1 and 6, during operation of the vehicle, each track 14 travels about its drive wheel 18, idler 20, and rollers. In so doing, the teeth 68, 69 of the sprockets 50-1, 50-2 engage respectively the drive caps 38-1, 38-2 of the cartridges 24 of the chain 16 to transmit power to the drive caps 38-1, 38-2 of each cartridge 24 to advance the track 14 in its forward or reverse direction. The two drive caps 38-1, 38-2 thus provide two load transfer points, rather than just one (e.g., the bushing). As such, each drive cap 38-1, 38-2 takes half of the load transfer to the cartridge 24, rather than the full brunt of the load as in the case where the bushing receives all of the load transfer, reducing high contact stresses and promoting greater uniformity in the transfer of power to the track 14 so as to provide a more balanced, equalized load transfer onto the chain.

Since the sprockets 50-1, 50-2 engage the drive caps 38-1, 38-2, the sprockets 50-1, 50-2 are located outside the links 26 and the two rails defined thereby. As such, material will not be compacted between the links 26 by the sprockets 50-1, 50-2. Thus, it is believed that there might be less chance of material build-up and ratcheting, since material lodged between the drive caps 38-1, 38-2 and sprockets 50-1, 50-2 will fall to the side of the track 14 rather than build up inside the track 14. As a result, the links 26 can be simplified, so as to be formed without material-evacuating holes. Each fastener (e.g., cap screw) used to mount a shoe 28 onto a link 26 is screwed into a blind hole drilled and tapped in the link 26.

Referring to FIG. 9, as the track 14 continues in its closed-loop path, the cartridges 24 approach the idler 20. In so doing, the drive caps 38-1, 38-2 contact respectively the rims 78-1, 78-2 of the idler 20 so as to ride thereon as the track 14 advances around the idler 20.

The cartridge 24 thus acts as a joint for the links 26-1a, 26-1b, 26-2a, 26-2b, allowing relative rotation between the first and second links 26-1a, 26-1b and the third and fourth links 26-2a, 26-2b. The pin 32 and drive caps 38-1, 38-2 are freely rotatable relative to the rest of the cartridge 24, the links 26-1a, 26-1b, 26-2a, 26-2b and the rest of the chain 16 and track 14, as when the drive caps 38-1, 38-2 engage and are driven by the sprockets 50-1, 50-2 and contact the rims 78-1, 78-2 of the idler 20, thereby minimizing the amount of wear on the drive caps 38-1, 38-2. Torsional rigidity of the chain 16 is maximized due to fixation of the first and second links 26-1a, 26-1b to the bushing 34. The cartridge 24 is thus designed for high impact.

Regarding materials, the main metal cartridge components (i.e., the pin 32, bushing 34, collars 36-1, 36-2, drive caps 38-1, 38-2, thrust washers 49-1a, 49-1b, 49-2a, 49-2b, as the case may be, and links 26-1a, 26-1b, 26-2a, 26-2b) may be made of conventional undercarriage materials, although any suitable material for such components could be used. They may be made of, for example, alloy steel conventional in the undercarriage industry. Boron, chromium molybdenum, and manganese may be included with the base material of such components.

The pin 32, collars 36-1, 36-2, and drive caps 38-1, 38-2 may be made of the base material used for pins on conventional sealed-and-lubricated chains (SALT chains) (i.e., chains with a pin, a bushing journalled on the pin, two links press-fitted to the bushing, and two links press-fitted t to the pin). For example, such components may be made of an alloy steel with a carbon content of 0.40% to 0.45% and suitable alloying elements, such as a 1045 steel-type of pin material which is heat treatable and common in the undercarriage industry, or, alternatively, a 4140 steel-type of pin material capable of being heat treated to a higher hardness level.

The bushing 34 may be made of the base material used for bushings on conventional SALT chains. In an example, the material for the bushing 34 may be an alloy steel with a 0.44% carbon content.

The links 26-1a, 26-2a, 26-1b, 26-2b may be made of an alloy steel used for links on conventional SALT chains. The thrust washers 49-1a, 49-1b, 49-2a, 49-2b may be made of an alloy steel used for thrust washers on conventional SALT chains.

The main metal components of the cartridge 24 and the links 26-1a, 26-1b, 26-2a, 26-2b may be hardened in a conventional manner in the undercarriage industry. The degree of hardening would depend on the machine platform and specific applications. The pin 32 and links 26-1a, 26-1b, 26-2a, 26-2b may be hardened using conventional hardening processes to conventional hardness levels for such components (e.g., induction hardening and/or other forms of heat treatment depending on the economics and requirements of the specific component). The bushing 34, collars 36-1, 36-2, and drive caps 38-1, 38-2 may be through-hardened, with a hardness level of, for example, 48 to 52 HRc (i.e., Hardness Rockwell C), with attention to a softer core. It is contemplated that the heat treating operations associated with the main metal components of the cartridge 24 and the links 26-1a, 26-1b, 26-2a, 26-2b may be tweaked to attain desired results, i.e., optimum strength with minimal brittleness.

In an example, the hardness and heat treatment of the main metal components of the cartridge 24 and the links 26-1a, 26-1b, 26-2a, 26-2b is the same as with conventional SALT chains, the pin 32 and links 26-1a, 26-1b, 26-2a, 26-2b matching respectively that of the pin and links of conventional SALT chains, the bushing 34, collars 36-1, 36-2, and drive caps 38-1, 38-2 matching that of the bushing of conventional SALT chains, and the thrust washers 49-1a, 49-1b, 49-2a, 49-2b, as the case may be, matching that of the thrust washers of conventional SALT chains.

While the disclosure has been illustrated and described in detail in the drawings and foregoing description (welds have not been shown, but are to be understood), such illustration and description are to be considered as exemplary and not restrictive in character, it being understood that illustrative embodiments have been shown and described and that all changes and modifications that come within the spirit of the disclosure are desired to be protected (threads in the drawings are shown for illustrative purposes, it being understood that actual thread specifications may be selected readily for a given application). It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

What is claimed is:

1. An endless track chain for use with a track-type vehicle, the track-type vehicle comprising a drive wheel comprising a first sprocket and a second sprocket, the endless track chain comprising:
 a first link set and a second link set, the first link set comprising a first link and a second link, the second link set comprising a third link and a fourth link, and
 a joint for relative rotation between the first link set and the second link set, the joint comprising:
  a pin,
  a bushing journalled on the pin for relative rotation between the bushing and the pin and fixed to the first and second links,
  a first collar and a second collar, the first and second collars positioned respectively axially outboard of the bushing, journalled on the pin for relative rotation between the first and second collars and the pin, and fixed respectively to the third and fourth links, and
  a first drive cap and a second drive cap, the first and second drive caps positioned respectively axially outboard of the first and second collars and fixed to the pin, the first and second drive caps configured to engage respectively the first and second sprockets.

2. The track chain of claim 1, wherein the joint comprises an annular first inboard seal positioned axially between the bushing and the first collar, an annular second inboard seal positioned axially between the bushing and the second collar, an annular first outboard seal positioned axially between the first collar and the first drive cap, and an annular second outboard seal positioned axially between the second collar and the second drive cap.

3. The track chain of claim 1, wherein the pin is rotatable relative to the first, second, third, and fourth links.

4. The track chain of claim 1, wherein the pin is solid.

5. The track chain of claim 1, wherein the bushing comprises an outside diameter surface, an inside diameter surface, and a lubricant-fill channel extending from the outside diameter surface to the inside diameter surface.

6. The track chain of claim 5, wherein the bushing comprises a lubricant reservoir arranged for fluid communication with the lubricant-fill channel.

7. The track chain of claim 6, wherein the lubricant reservoir is configured as an annular recess defined in the inside diameter surface of the bushing.

8. The track chain of claim 5, comprising a plug positioned in the lubricant-fill channel.

9. The track chain of claim 1, comprising a plug, wherein the pin is solid, the bushing comprises an outside diameter surface, an inside diameter surface, a lubricant-fill channel extending from the outside diameter surface to the inside diameter surface, and a lubricant reservoir configured as an annular recess defined in the inside diameter surface and arranged for fluid communication with the lubricant-fill channel, and the plug is positioned in the lubricant-fill channel.

10. The track chain of claim 1, wherein the pin, the bushing, the first and second collars, and the first and second drive caps are included in a cartridge assembled before fixation to the first, second, third, and fourth links.

11. The track chain of claim 1, wherein each of the bushing, the first collar, and the first drive cap comprises an outside diameter surface having an outside diameter, the outside diameter surface of the bushing mates with the first link, the outside diameter surface of the first collar mates with the third link, the outside diameter of the outside diameter surface of the first collar is greater than the outside diameter of the outside diameter surface of the first drive cap, the outside diameter of the outside diameter surface of the bushing is greater than the outside diameter of the outside diameter surface of the first collar.

12. The track chain of claim 1, wherein the bushing comprises a first outside diameter surface having a first outside diameter and mating with the first link and a second outside diameter surface having a second outside diameter and mating with the second link, and the first and second outside diameters are different from one another.

13. The track chain of claim 1, wherein the first drive cap is configured as a collar flush with a first end face of the pin, and the second drive cap is configured as a collar flush with a second end face of the pin.

14. A cartridge for use as a joint in an endless track chain of a track-type vehicle, the track-type vehicle comprising a drive wheel, the drive wheel comprising a first sprocket and a second sprocket, the endless track chain trained about the first and second drive sprockets and comprising a first link set and a second link set, the first link set comprising a first link and a second link, the second link set comprising a third link and a fourth link, the cartridge configured to be joined to the first, second, third, and fourth links for relative rotation between the first link set and the second link set, the cartridge comprising components assembled to provide the cartridge before the cartridge is joined to those links, the cartridge sealed to contain lubricant within the cartridge, the cartridge configured to engage the first and second sprockets, wherein the components of the cartridge comprise:
 a pin,
 a bushing journalled on the pin for relative rotation between the bushing and the pin and configured to be fixed to the first and second links,
 a first collar and a second collar, the first and second collars positioned respectively axially outboard of the bushing, journalled on the pin for relative rotation between the first and second collars and the pin, and configured to be fixed respectively to the third and fourth links,
 a first drive cap and a second drive cap, the first and second drive caps positioned respectively axially outboard of the first and second collars and fixed to the pin, the first and second drive caps configured to engage respectively the first and second sprockets,
 an annular first inboard seal and an annular second inboard seal, the first inboard seal positioned axially between the bushing and the first collar, the second inboard seal positioned axially between the bushing and the second collar, and
 an annular first outboard seal and an annular second outboard seal, the first outboard seal positioned axially between the first collar and the first drive cap, the second outboard seal positioned axially between the second collar and the second drive cap.

15. The cartridge of claim 14, wherein each of the bushing, the first collar, and the first drive cap comprises an outside diameter surface having an outside diameter, the outside diameter surface of the bushing is configured to mate with the first link, the outside diameter surface of the first collar is configured to mate with the third link, the outside diameter of the outside diameter surface of the first collar is greater than the outside diameter of the outside diameter surface of the first drive cap, the outside diameter of the outside diameter surface of the bushing is greater than the outside diameter of the outside diameter surface of the first collar.

16. The cartridge of claim 14, wherein the bushing comprises a first outside diameter surface having a first outside diameter and configured to mate with the first link and a second outside diameter surface having a second outside diameter and configured to mate with the second link, and the first and second outside diameters are different from one another.

17. The cartridge of claim 14, wherein the first drive cap is configured as a collar flush with a first end face of the pin, and the second drive cap is configured as a collar flush with a second end face of the pin.

18. An endless track chain for use with a track-type vehicle, comprising a first link set, a second link set, and the cartridge of claim 14, wherein the first link set comprises a first link and a second link, the second link set comprises a third link and a fourth link, the bushing is fixed to the first and second links, and the first and second collars are fixed respectively to the third and fourth links.

19. The cartridge of claim 14, wherein the pin is freely rotatable.

* * * * *